(12) United States Patent
Julien et al.

(10) Patent No.: US 10,815,877 B2
(45) Date of Patent: Oct. 27, 2020

(54) METHOD OF OPERATING A ROTARY ENGINE

(71) Applicant: PRATT & WHITNEY CANADA CORP., Longueuil (CA)

(72) Inventors: Andre Julien, Ste-Julie (CA); Edwin Schulz, St-Bruno (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 830 days.

(21) Appl. No.: 15/408,784

(22) Filed: Jan. 18, 2017

(65) Prior Publication Data
US 2018/0202354 A1    Jul. 19, 2018

(51) Int. Cl.
| F02B 53/02 | (2006.01) |
| F02B 53/10 | (2006.01) |
| F02B 19/10 | (2006.01) |
| F02D 41/00 | (2006.01) |
| F02B 53/00 | (2006.01) |

(52) U.S. Cl.
CPC .............. *F02B 53/02* (2013.01); *F02B 19/10* (2013.01); *F02B 53/10* (2013.01); *F02D 41/0087* (2013.01); *F02B 2053/005* (2013.01); *Y02T 10/125* (2013.01); *Y02T 10/17* (2013.01)

(58) Field of Classification Search
CPC .... F02B 19/10; F02B 2053/005; F02B 53/02; F02B 53/10; F02B 19/108; F02B 1/04; F02B 3/06; F02B 19/02; F02B 19/04; F02D 41/0087; F02D 41/3041; F02D 41/3047; F02D 41/34; F02D 41/345; F02D 41/403; Y02T 10/125; Y02T 10/17; F01C 1/22; F02G 1/02

USPC ........................ 123/209, 445; 60/39.6, 39.62
See application file for complete search history.

(56) References Cited

U.S. PATENT DOCUMENTS

| 3,245,388 A | 4/1966 | Froede et al. |
| 3,265,046 A | 8/1966 | Paschke |
| 3,289,648 A | 12/1966 | Müller |
| 3,882,828 A | 5/1975 | Honiden |
| 8,838,367 B1 * | 9/2014 | McAlister .............. F02M 27/04 701/110 |

(Continued)

OTHER PUBLICATIONS

Wilcutts, M., Switkes, J., Shost, M. and Tripathi, A., Design and Benefits of Dynamic Skip Fire Strategies for Cylinder Deactivated Engines, SAE Int. J. Engines,vol. 6, Issue 1, May 2013.

(Continued)

*Primary Examiner* — Patrick Hamo
*Assistant Examiner* — Paul W Thiede
(74) *Attorney, Agent, or Firm* — Norton Rose Fulbright Canada LLP (57) ABSTRACT

A method of operating a rotary engine including a rotor engaged to a shaft and rotationally received in a housing to define a plurality of working chambers of variable volume, including delivering a pilot quantity of fuel into a pilot cavity in successive communication with the working chambers, igniting the pilot quantity of fuel within the pilot cavity, and delivering a main quantity of fuel into the working chambers downstream of the successive communication of the pilot cavity with the working chambers, where at least one of the pilot quantity and the main quantity is varied between successive rotations of the shaft.

21 Claims, 5 Drawing Sheets

(56) References Cited

U.S. PATENT DOCUMENTS

| | | | |
|---|---|---|---|
| 9,376,996 B2 | 6/2016 | Seki | |
| 2008/0308065 A1* | 12/2008 | Imai | F02D 41/1497 |
| | | | 123/299 |
| 2013/0025567 A1* | 1/2013 | Thomassin | F01C 1/22 |
| | | | 123/209 |
| 2014/0261293 A1* | 9/2014 | Schulz | F02B 19/108 |
| | | | 123/209 |

OTHER PUBLICATIONS

Lindsay Brooke, Delphi's multi-domain mindset, Automotive Engineering, Oct. 2016.

* cited by examiner

METHOD OF OPERATING A ROTARY ENGINE

TECHNICAL FIELD

The application relates generally to internal combustion engines and, more particularly, to fuel injection in such engines.

BACKGROUND OF THE ART

It is generally known to completely deactivate some cylinders of a reciprocating internal combustion engine to reduce fuel consumption at part load. Also, dynamic skip fire allows to rapidly stop and restart injection within a cylinder so that a cylinder receives no fuel, and does not undergo combustion, for example for a single combustion event. This is often accompanied with high speed modifications to the valve train to reduce pumping loss during the skipped injections. However, completely stopping combustion in a cylinder may create thermal loading on the engine and impede the ability of the engine for a rapid relight when higher power is required.

SUMMARY

In one aspect, there is provided a method of operating a rotary engine including a rotor engaged to a shaft and rotationally received in a housing to define a plurality of working chambers of variable volume, the method comprising: delivering a pilot quantity of fuel into a pilot cavity in successive communication with the working chambers; igniting the pilot quantity of fuel within the pilot cavity; and delivering a main quantity of fuel into the working chambers downstream of the successive communication of the pilot cavity with the working chambers; wherein at least one of the pilot quantity and the main quantity is varied between successive rotations of the shaft.

In another aspect, there is provided a method of operating a rotary engine including first and second rotor assemblies and a shaft, the first and second rotor assemblies including a rotor engaged to the shaft and rotationally received in a housing to define a plurality of working chambers of variable volume, and a pilot cavity in successive communication with the working chambers, the method comprising: delivering a pilot quantity of fuel into the pilot cavity; igniting the pilot quantity of fuel within the pilot cavity; and delivering a main quantity of fuel into the working chambers downstream of the successive communication of the pilot cavity with the working chambers; wherein at least one of the pilot quantity and the main quantity of the first rotor assembly is varied between successive rotations of the shaft; wherein at least one of the pilot quantity and the main quantity is different between the first and second rotor assemblies during at least one of the successive rotations of the shaft.

DESCRIPTION OF THE DRAWINGS

Reference is now made to the accompanying figures in which.

DETAILED DESCRIPTION

Figure 1:
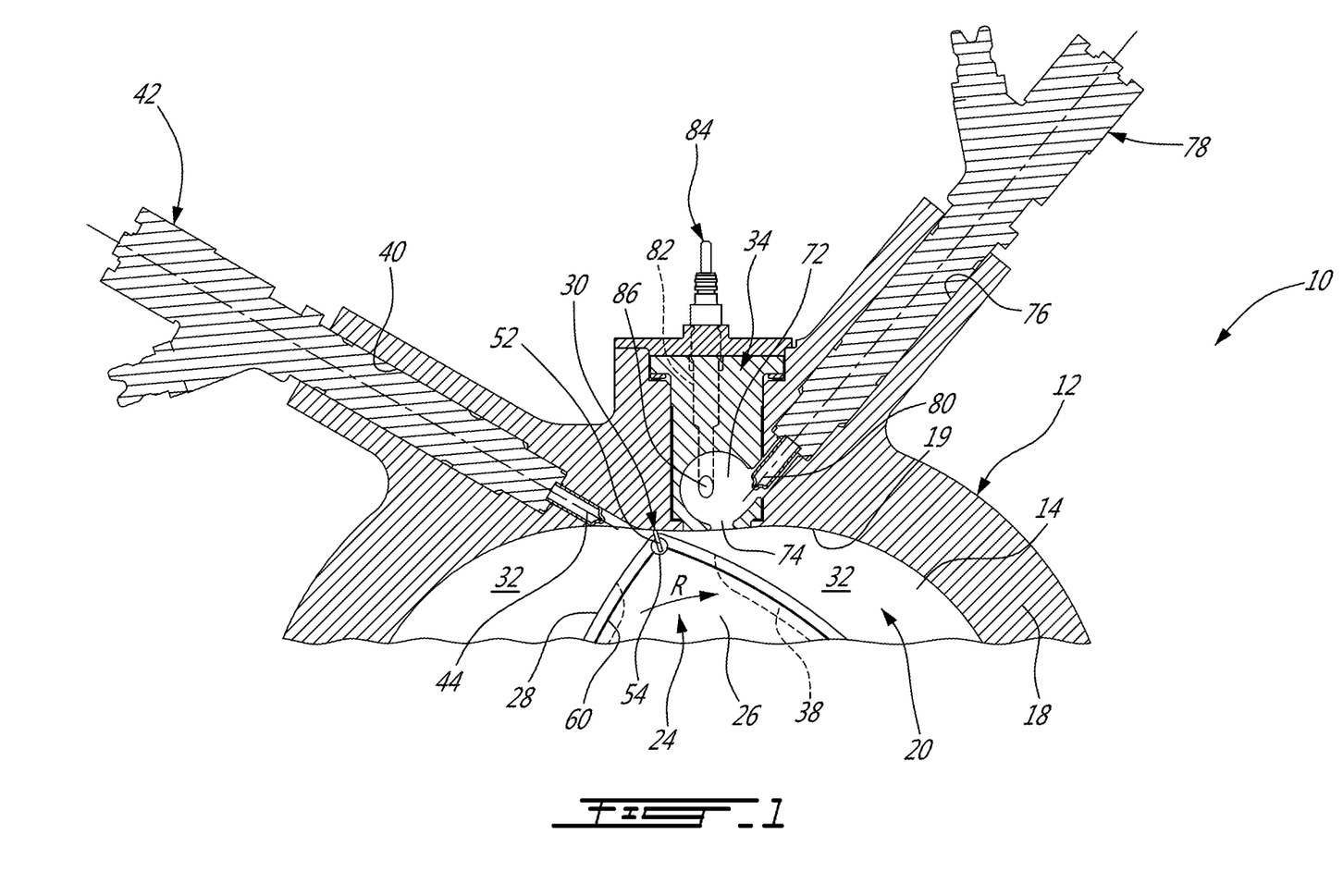
FIG. 1 is a schematic partial cross-sectional view of a rotor assembly in accordance with a particular embodiment.

Referring to FIG. 1, a rotor assembly configured as a rotary intermittent internal combustion engine 10 is schematically and partially shown. The rotor assembly 10 is known as a Wankel engine and comprises an outer body 12 having axially-spaced end walls 14 with a peripheral wall 18 extending therebetween to form an internal cavity 20. The inner surface 19 of the peripheral wall 18 of the internal cavity 20 has a profile defining two lobes, which is preferably an epitrochoid.

An inner body or rotor 24 is received within the internal cavity 20, with the geometrical axis of the rotor 24 being offset from and parallel to the axis of the outer body 12. The rotor 24 has axially spaced end faces 26 adjacent to the outer body end walls 14, and a peripheral face 28 extending therebetween. The peripheral face 28 defines three circumferentially-spaced apex portions 30 (only one of which is shown), and a generally triangular profile with outwardly arched sides. The apex portions 30 are in sealing engagement with the inner surface of peripheral wall 18 to form three rotating working chambers 32 (only two of which are partially shown) between the inner rotor 24 and outer body 12. A recess 38 is defined in the peripheral face 28 of the rotor 24 between each pair of adjacent apex portions 30, to form part of the corresponding chamber 32.

The working chambers 32 are sealed. Each rotor apex portion 30 has an apex seal 52 extending from one end face 26 to the other and protruding radially from the peripheral face 28. Each apex seal 52 is biased radially outwardly against the peripheral wall 18 through a respective spring. An end seal 54 engages each end of each apex seal 52, and is biased against the respective end wall 14 through a suitable spring. Each end face 26 of the rotor 24 has at least one arc-shaped face seal 60 running from each apex portion 30 to each adjacent apex portion 30, adjacent to but inwardly of the rotor periphery throughout its length. A spring urges each face seal 60 axially outwardly so that the face seal 60 projects axially away from the adjacent rotor end face 26 into sealing engagement with the adjacent end wall 14 of the internal cavity 20. Each face seal 60 is in sealing engagement with the end seal 54 adjacent each end thereof.

Although not shown in FIG. 1, the rotor 24 is journaled on an eccentric portion of a shaft 22 (FIG. 2) and includes a phasing gear co-axial with the rotor axis, which is meshed with a fixed stator phasing gear secured to the outer body co-axially with the shaft. The rotor 24 rotates the shaft 22 and the meshed gears guide the rotor 24 to perform orbital revolutions within the internal cavity 20. The shaft 22 performs three rotations for each orbital revolution of the rotor 24 in the internal cavity 20. Oil seals are provided around the phasing gear to prevent leakage flow of lubricating oil radially outwardly thereof between the respective rotor end face 26 and outer body end wall 14.

At least one inlet port (not shown) is defined through one of the end walls 14 or the peripheral wall 18 for admitting air (atmospheric or compressed) into one of the working chambers 32, and at least one exhaust port (not shown) is defined through one of the end walls 14 or the peripheral wall 18 for discharge of the exhaust gases from the working chambers 32. The inlet and exhaust ports are positioned relative to each other and relative to the ignitor and fuel injectors (further described below) such that during each revolution of the rotor 24, each chamber 32 moves around the internal cavity 20 with a variable volume to undergo the four phases of intake, compression, expansion and exhaust, these phases being similar to the strokes in a reciprocating-type internal combustion engine having a four-stroke cycle.

In a particular embodiment, these ports are arranged such that the rotor assembly 10 operates under the principle of the Miller or Atkinson cycle, with its volumetric compression ratio lower than its volumetric expansion ratio. In another embodiment, the ports are arranged such that the volumetric compression and expansion ratios are equal or similar to one another.

A pilot cavity is defined in the outer body 12, for pilot fuel injection and ignition. In the embodiment shown example, the pilot cavity is in the form of a pilot subchamber 72, provided in an insert 34 received in a corresponding insert opening defined through the peripheral wall 18 of the outer body 12 and in communication with the internal cavity 20, for pilot fuel injection and ignition. In a particular embodiment, the insert 34 is made of a material having a greater heat resistance than that of the peripheral wall 18, which may be made for example of aluminium. For example, the insert 34 may be made of an appropriate type of ceramic or of an appropriate type of super alloy such as a Nickel based super alloy. Other configurations are also possible, including configurations where the pilot cavity (e.g. pilot subchamber 72) is defined directly in the outer body 12, for example in the peripheral wall 18.

The pilot subchamber 72 is in communication with the internal cavity 20. In the embodiment shown, the pilot subchamber 72 has a circular cross-section; alternate shapes are also possible. The pilot subchamber 72 communicates with the internal cavity 20 through at least one opening 74, and has a shape forming a reduced cross-section adjacent the opening 74, such that the opening 74 defines a restriction to the flow between the pilot subchamber 72 and the internal cavity 20. The opening 74 may have various shapes and/or be defined by multiple holes.

The peripheral wall 18 has a pilot injector elongated hole 76 defined therethrough in proximity of the pilot subchamber 72, and in communication with the pilot subchamber 72. A pilot fuel injector 78 is received and retained within the corresponding hole 76, with the tip 80 of the pilot injector 78 in communication with the pilot subchamber 72.

The insert 34 and/or peripheral wall 18 have an ignitor elongated hole 82 defined therein, also in communication with the pilot subchamber 72. An ignitor or ignition element 84 is received and retained within the corresponding hole, with the tip of the ignitor 84 communicating with the pilot subchamber 72, for example by having the ignitor 84 extending outside of the pilot subchamber 72 and the ignitor elongated hole communicating with the pilot subchamber 72 through an opening or passage 86 aligned with the ignitor tip. In the embodiment shown, the ignitor 84 is a glow plug. Alternate types of ignitors 84 which may be used include, but are not limited to, plasma ignition, laser ignition, spark plug, microwave, etc.

It is understood that the pilot subchamber 72 may be omitted; in a particular embodiment which is not shown, the pilot subchamber 72 is replaced by any other suitable type of pilot cavity formed in the outer body 12, for example a recess defined in the peripheral wall 18. The pilot fuel injector 78 and the ignitor 84 having tips received in or communicating with the pilot cavity so as to perform the fuel ignition therein.

The peripheral wall 18 also has a main injector elongated hole 40 defined therethrough, in communication with the internal cavity 20 and spaced apart from the pilot cavity and pilot injector 78. A main fuel injector 42 is received and retained within this corresponding hole 40, with the tip 44 of the main injector 42 communicating with the internal cavity 20 at a point spaced apart from the communication between the pilot cavity and internal cavity 29 (e.g. from the subchamber opening 74). The main injector 42 is located rearwardly of the subchamber opening 74 with respect to the direction R of the rotor rotation and revolution, i.e. downstream from the communication 74 between the pilot subchamber 72 and working chambers 32, and is angled to direct fuel forwardly into each of the rotating chambers 32 sequentially with a tip hole configuration designed for an adequate spray.

The pilot injector 78 and main injector 42 inject fuel, which in a particular embodiment is heavy fuel e.g. diesel, kerosene (jet fuel), equivalent biofuel, etc. into the chambers 32. Alternately, the fuel may be any other adequate type of fuel suitable for injection as described, including non-heavy fuel such as for example gasoline or liquid hydrogen fuel. In a particular embodiment, the pilot injector 78 and main injector 42 deliver the same type of fuel, for example from a common fuel source; alternately, the pilot injector 78 and main injector 42 may deliver different type of fuel. In a particular embodiment, up to 20% of a maximum fuel flow (sum of maximum flow of the pilot injector 78 and main injector 42) is injected through the pilot injector 78 when used; other values are also possible, for example having the pilot injector 78 deliver up to 10%, or up to 5%, of the maximum fuel flow when used. The main injector 42 injects the fuel such that each working chamber 32 when in the combustion phase contains a lean mixture of air and fuel.

The pilot subchamber 72 may help create a stable and powerful ignition zone to ignite the overall lean working chamber 32 to create the stratified charge combustion. The pilot subchamber 72 may improve combustion stability, particularly but not exclusively for a rotor assembly which operates with heavy fuel below the self-ignition of fuel. The insert 34 made of a heat resistant material may advantageously create a hot wall around the pilot subchamber 78 which may further help with ignition stability.

In a particular embodiment, the rotor assembly 10 is operated in accordance with the following. A pilot quantity of fuel is delivered into the pilot subchamber 72 and ignited within the pilot subchamber 72, and a main quantity of fuel is delivered into the working chambers 32 downstream of their communication with the pilot subchamber 72. When the rotor assembly 10 operates at maximum load, both the pilot quantity and the main quantity may correspond to a maximum pilot and main injection fuel flow, respectively. However, when the rotor assembly 10 operates at part load, some of the pilot and/or main injections are reduced or skipped, so as to reduce the fuel consumption, noise and/or vibrations on the rotor assembly 10. Accordingly, one or both of the pilot and main quantity is varied between successive rotations of the shaft 22, i.e. between successive working chambers 32 (since the shaft 22 performs three rotations for each complete revolution of the rotor 24, each shaft rotation corresponds to fuel injection in one of the working chambers 32). For example, the pilot and/or main injection quantity may be zero (skipped injection) for at least one of the successive rotations of the shaft 22, and greater than zero (e.g., maximum value) for at least another one of the successive rotations of the shaft 22.

Various injection patterns may be used to vary the quantity of fuel injected by the pilot and/or main injector(s) 78, 42 between the successive rotations of the shaft 22. In a particular embodiment, the injection pattern is repeated for each set of first, second and third successive rotations of the shaft 22, and accordingly each of the three working chambers 32 has its particular injection conditions. For example, for the first shaft rotation (first working chamber 32), the main quantity is zero and the pilot quantity is greater than zero, i.e. the main injection is skipped while a pilot injection is performed; for the second rotation (second working chamber 32), the main and pilot quantities are both zero, i.e. both the main and pilot injections are skipped; and for the third rotation (third working chamber 32), the main and pilot quantities are both greater than zero, i.e. a pilot and main injections are both performed.

Various other injection patterns can be used. The following are a few non-limiting examples, where x is a natural number greater than 1:

the pilot injection is skipped (pilot quantity of zero) for one of x successive rotations of the shaft 22, and performed (pilot quantity greater than zero) for the remaining x−1 successive rotations of the shaft 22. For example, the pilot injection is skipped every second shaft rotation, or every third shaft rotation, or every fourth shaft rotation, etc.;

the pilot injection is performed (pilot quantity greater than zero) for one of x successive rotations of the shaft 22, and skipped (pilot quantity of zero) for the remaining x−1 successive rotations of the shaft 22. For example, the pilot injection is performed only every second shaft rotation, or only every third shaft rotation, or only every fourth shaft rotation, etc.

the main injection is skipped (main quantity of zero) for one of x successive rotations of the shaft 22, and performed (main quantity greater than zero) for the remaining x−1 successive rotations of the shaft 22. For example, the main injection is skipped every second shaft rotation, or every third shaft rotation, or every fourth shaft rotation, etc.;

the main injection is performed (main quantity greater than zero) for one of x successive rotations of the shaft 22, and skipped (main quantity of zero) for the remaining x−1 successive rotations of the shaft 22. For example, the main injection is performed only every second shaft rotation, or only every third shaft rotation, or only every fourth shaft rotation, etc.;

the main injection includes two sequential injection pulses for each working chamber 32 (e.g. main pulse and post injection pulses), and one of these pulses is omitted (skipped) for one of the x successive rotations of the shaft 22, and performed for the remaining x−1 successive rotations of the shaft 22. For example, one of the pulses is skipped every second shaft rotation, or every third shaft rotation, or every fourth shaft rotation, etc. The other pulse can remain constant, have a variable quantity, or be skipped using a similar or different pattern;

with the main injection includes two sequential injection pulses, and one of the pulses is performed for one of x successive rotations of the shaft 22, and omitted (skipped) for the remaining x−1 successive rotations of the shaft 22. For example, one of the pulses is performed only every second shaft rotation, or only every third shaft rotation, or only every fourth shaft rotation, etc. The other pulse can remain constant, have a variable quantity, or be skipped using a similar or different injection pattern.

It is understood that the examples of injection patterns for the pilot injection by the pilot injector 78 can be combined with a main injection by the main injector 42 which is maintained throughout the x successive shaft rotations, whether with a fixed or variable main quantity, or skipped following any suitable injection pattern, and that the examples of injection patterns for the main injection by the main injector 42 can be combined with a pilot injection by the pilot injector 78 which is maintained throughout the x successive shaft rotations, whether with a fixed or variable pilot quantity, or skipped following any suitable injection pattern. The pilot injection can also be performed in two or more pulses, and the main injection can be performed in more than two pulses; each pulse can be varied, for example as indicated above, without or with variation of the other pulses.

In a particular embodiment, an engine control unit 16 (see FIG. 2), for example forming part of a full authority digital engine (or electronics) control (FADEC), controls the pilot and main fuel injectors 78, 42, for example through actuation of electronic valves within the fuel injectors 78, 42 to control the injection pulses. The flexibility of the engine control software allows for the choice of firing or skipping all injection opportunities. For example, a control algorithm may be created to control the injection and apply injection pattern(s) based on the power demand on the rotor assembly 10, so as to implement an injection pattern (e.g. including pilot and/or main injection skipping) when the power demand is lower than a threshold value, or select between multiple injection patterns each corresponding to a respective range in power demand.

In a particular embodiment, the ability to keep one of the pilot and main injectors 78, 42 on while skipping the other of the pilot and main injectors 78, 42 allows for the rotor assembly 10 to always stay warm and reduce thermal loading, and facilitates engine relight when needed.

Figure 2:
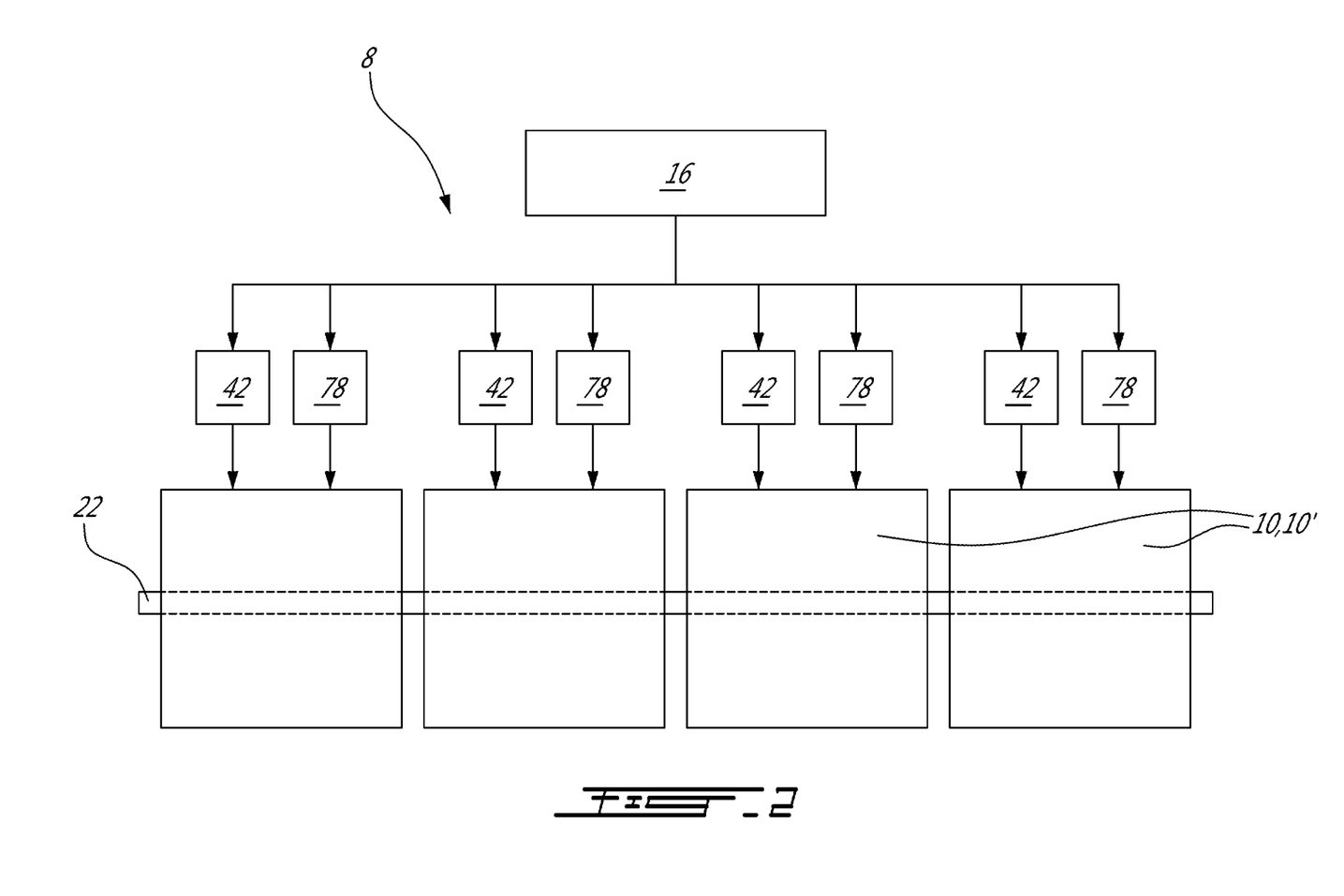
FIG. 2 is a schematic view of an engine in accordance with a particular embodiment, which can include rotor assemblies such as shown in FIG. 1.

In a particular embodiment, an engine includes a single rotor assembly 10, i.e. the rotor assembly 10 can be referred to as a rotary intermittent internal combustion engine. In another embodiment, multiple rotor assemblies 10 are used together to defined an intermittent internal combustion engine. Referring to FIG. 2, an intermittent internal combustion engine 8 is schematically shown, including four (4) rotor assemblies 10 engaged to the same shaft 22. It is understood that the engine 8 can includes any other suitable number of rotor assemblies 10, i.e. one (1) rotor assembly 10, two (2) or three (3) rotor assemblies, or more than four (4) rotor assemblies 10.

The pilot and/or main quantities of fuel can be varied as set forth above, for a single one, only some, or all of the rotor assemblies 10 forming part of the engine 8. In a particular embodiment, the variation in pilot and main injection is the same for all of the rotor assemblies 10; in another embodiment, at least one of the rotor assemblies 10 has a constant pilot and main injection throughout the rotations of the shaft 22, and at least another one of the rotor assemblies 10 has a variable pilot and/or main injection between successive rotations of the shaft 22, as set forth above. Accordingly, one or both of the pilot and main quantities of fuel is different between two of the rotor assemblies 10 during at least one of the successive rotations of the shaft 22. One or both of the pilot and main quantities of fuel may be different between more than two, for example all, of the rotor assemblies 10 during at least one of the successive rotations of the shaft 22.

For example, in a particular embodiment one or both of the pilot quantity and the main quantity is different between first, second and third rotor assemblies 10 of the engine 8 during the at least one of the successive rotations of the shaft 22.

Since the rotor assemblies 10 do not include valves at the inlet and outlet ports, and the inlet is not throttled, the injection skipping can be performed without the need for valve train modifications.

In a particular embodiment, implementation of injection patterns (e.g. with pilot and/or main injection skipping) on more than one, for example all, of the rotor assemblies 10 of the engine 8 allows to distribute the load reduction throughout the engine 8.

In a particular embodiment, implementation of injection patterns (e.g. with pilot and/or main injection skipping) allows for a reduction in fuel consumption, noise, vibrations and/or torque pulsing during operation at part load, while decreasing wear on the engine components, as compared with operation of an engine where injection in one or more of the rotor assemblies 10 is completely shut off during part load operation.

In a particular embodiment, the engine 8 including one or more rotor assemblies 10 is used in a compound cycle engine system or compound cycle engine such as described in Lents et al.'s U.S. Pat. No. 7,753,036 issued Jul. 13, 2010 or as described in Julien et al.'s U.S. Pat. No. 7,775,044 issued Aug. 17, 2010, or as described in Thomassin et al.'s U.S. patent publication No. 2015/0275749 published Oct. 1, 2015, or as described in Bolduc et al.'s U.S. patent publication No. 2015/0275756 published Oct. 1, 2015, the entire contents of all of which are incorporated by reference herein. The compound cycle engine may be used as a prime mover engine, such as on an aircraft or other vehicle, or in any other suitable application. In any event, in such a system, air is compressed by a compressor before entering the rotor assembly, and the engine drives one or more turbine(s) of the compound engine. In another embodiment, the engine 8 is used without a turbocharger, with air at atmospheric pressure.

When the engine 8 is used with a turbine, for example in a compound cycle engine as mentioned above, a post-injection pulse of the main injector 42 can be maintained while the main injection pulse of the main injector 42 and/or pilot injection of the pilot injector 78 are skipped; maintaining the post-injection pulse may help maintain adequate inlet conditions for the turbine receiving the engine exhaust.

In a particular embodiment, implementation of injection patterns (e.g. with pilot and/or main injection skipping) allows to reduce the power provided by the engine 8 without the need to resort to a reduction in the air compression upstream of the engine 8 (for example, through control of variable inlet guide vanes of the compressor in the compound cycle engine), and/or a change in the air temperature upstream of the engine 8 (for example, by bypassing an intercooler).

For example, in a particular embodiment of compound cycle engine used as a turboprop, the compressor is designed to be efficient in flight (e.g. compression ratio of 6:1 or 7:1), but may need to have a significantly smaller compression ratio when the compound cycle engine is used at idle on the ground (for example, 3:1), which may be difficult to obtain with variable inlet guide vanes. Implementation of injection patterns (e.g. with pilot and/or main injection skipping) allows for a reduction of power without reducing the compression ratio of the compressor, which may allow the compressor to function at a higher compression ratio when at idle on the ground (for example, 4:1). Accordingly, implementation of injection patterns (e.g. with pilot and/or main injection skipping) may allow for an easier match between the requirements of the components of the compound cycle engine.

Figure 3:
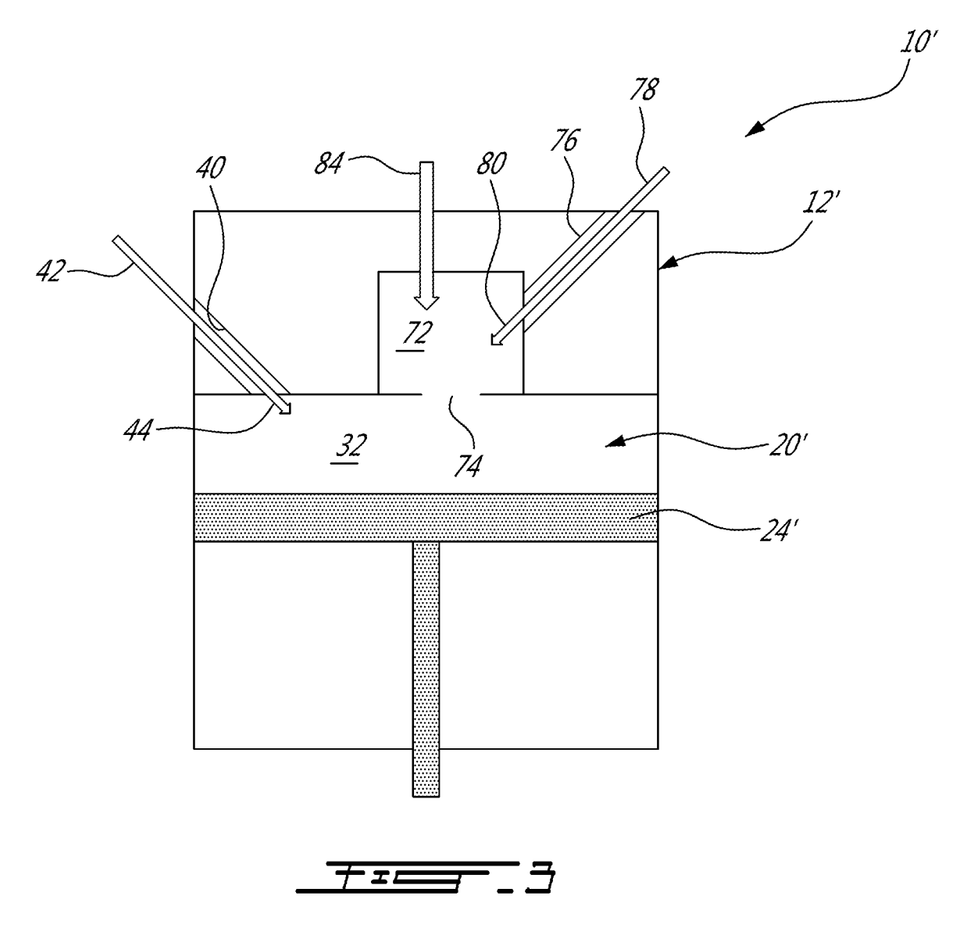
FIG. 3 is a schematic cross-sectional view of a reciprocating piston assembly in accordance with a particular embodiment, which may be used in the engine of FIG. 2.

In another embodiment and still referring to FIG. 2, the engine 8 is a reciprocating intermittent internal combustion engine including at least two (four in the embodiment shown) cylinders 10' each receiving a reciprocating piston. As illustrated in FIG. 3, each piston 24' is received in a corresponding internal cavity 20' of the cylinder housing 12' to define a working chamber 32 of variable volume and undergoing the four stroke phases of intake, compression, expansion and exhaust, with the reciprocating pistons 24' engaged to the engine shaft 22 (FIG. 2). The engine 8 includes, for each cylinder 10', a main injector 42, an ignitor 84, a pilot subchamber 72 (or other suitable pilot cavity) communicating with the working chamber 32 separately from the main injector 42, and a pilot injector 78 in communication with the pilot subchamber 72.

The pilot and/or main quantities of fuel can be varied as set forth above, for a single one, only some, or the entirety of the cylinders 10' forming part of the engine 8, as described above, for example using one of the injection patterns described for the rotor assemblies 10, or any other suitable injection pattern. In a particular embodiment, implementation of injection patterns (e.g. with pilot and/or main injection skipping) on more than one, for example all, of the cylinders 10' of the engine 8 allows to distribute the load reduction throughout the engine 8.

In another embodiment, the engine 8 includes one or more rotor assemblies configured as a non-Wankel engine. A "non-Wankel" engine, as used herein, means a rotary engine suitable for use with the present invention, but excluding Wankel type engines.

In a particular embodiment, the rotor assembly may be a single or eccentric type rotary engine in which the rotor rotates about a fixed center of rotation. For example, the rotor assembly may be a sliding vane engine, such as described in U.S. Pat. No. 5,524,587 issued Jun. 11, 1996 or in U.S. Pat. No. 5,522,356 issued Jun. 4, 1996, the entire contents of both of which are incorporated by reference herein.

Figure 4:
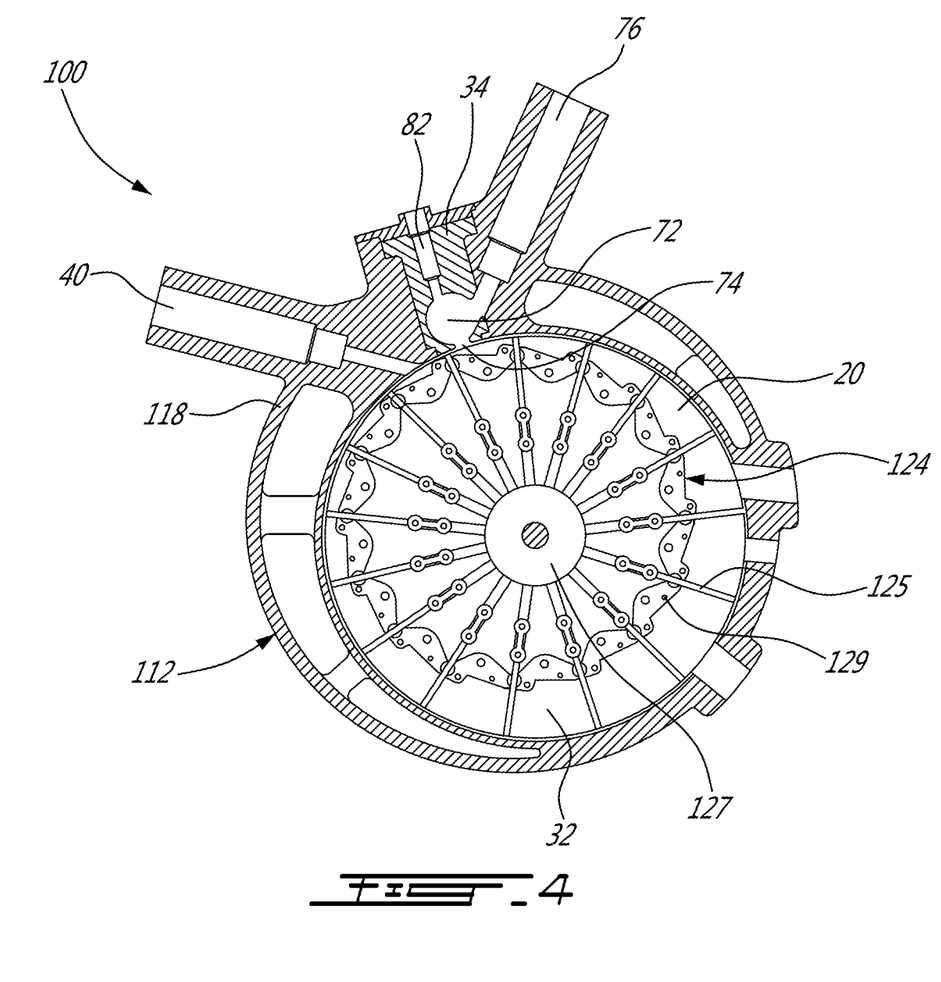
FIGS. 4-6 are schematic cross-sectional views of rotor assemblies in accordance with other particular embodiments, which may be used in the engine of FIG. 2.

Referring to FIG. 4, an example of a rotor assembly 100 configured as a sliding vane engine is shown. The rotor assembly 100 includes an outer body 112 defining an internal cavity 20 receiving a rotor 124 having a number of vanes 125. The rotor 124 includes an inner hub assembly 127 rotating about a first axis and an outer hub assembly 129 rotating about a second axis offset from the first axis, with the two hub assemblies 127, 129 being mechanically linked. The vanes 125 are pivotally connected to the inner hub assembly 127 and are slidingly engaged through slots defined between adjacent sections of the outer hub assembly 129. The sections of the outer hub assembly 129 are thus sealingly engaged to the vanes 125 at different distances from the first axis of the inner hub assembly 127, defining a plurality of chambers 32 of variable volume within the internal cavity 20 around the rotor 124.

In the embodiment shown, the pilot subchamber 72 of the rotor assembly 100 is defined in the insert 34 (for example made of a material having a greater heat resistance than that of the peripheral wall 118) received in an insert opening of a peripheral wall 118 of the outer body 112; alternately the pilot subchamber 72 may be defined directly in the outer body 112, for example in the peripheral wall 118, or the pilot injector 72 may be received in any other suitable type of pilot cavity formed in the outer body 112. The peripheral wall 118 also has a main injector elongated hole 40 defined therethrough, in communication with the internal cavity 20 and spaced apart from the insert 34. The peripheral wall 118 and/or the insert 34 has the pilot injector elongated hole 76 and the ignitor elongated hole 82 defined therethrough in communication with the pilot subchamber 72.

Figure 5:
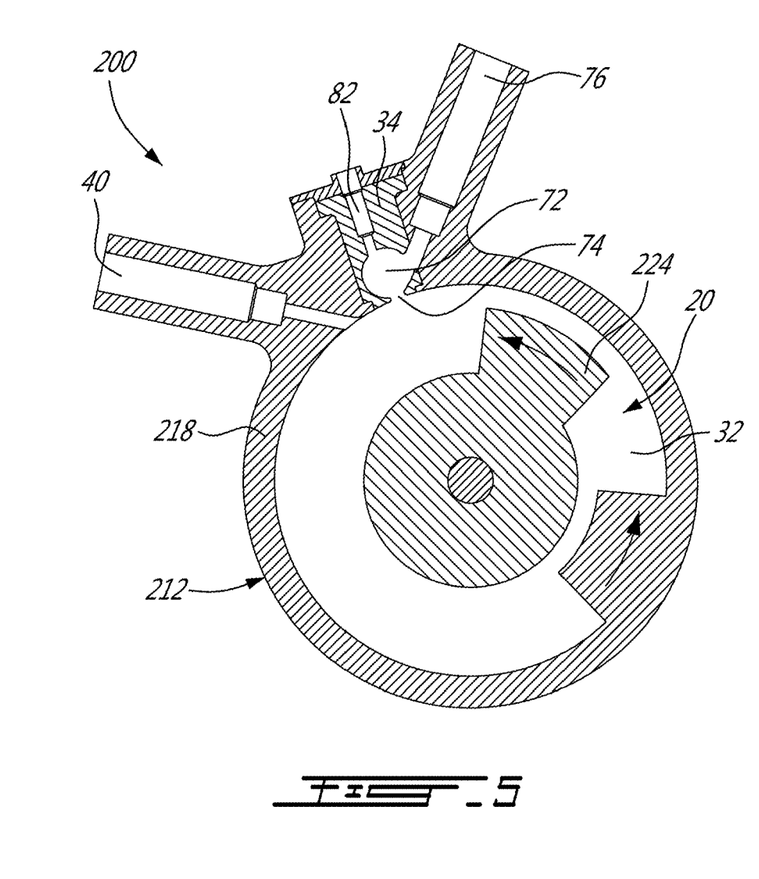

In another particular embodiment, the rotor assembly may be an oscillatory rotating engine, including two or more rotors rotating at different angular velocities, causing the distance between portions of the rotors to vary and as such the chamber volume to change. Referring to FIG. 5, an example of such a rotor assembly is shown. The rotor assembly 200 includes an inner rotor 224 and an outer body or rotor 212 rotating at different angular velocities, the outer rotor 212 defining an internal cavity 20 in which the inner rotor 212 is received. Chambers 32 of variable volume are defined within the internal cavity 20 around the inner rotor 224.

In the embodiment shown, the pilot subchamber 72 of the rotor assembly 200 is defined in the insert 34 (for example made of a material having a greater heat resistance than that of the peripheral wall 218) received in an insert opening of a peripheral wall 218 of the outer body 212; alternately the pilot subchamber 72 may be defined directly in the outer body 212, for example in the peripheral wall 218, or the pilot injector 72 may be received in any other suitable type of pilot cavity formed in the outer body 212. The peripheral wall 218 also has the main injector elongated hole 40 defined therethrough spaced apart from the insert 34, and the peripheral wall 218 and/or the insert 34 has the pilot injector elongated hole 76 and the ignitor elongated hole 82 defined therethrough.

Figure 6:
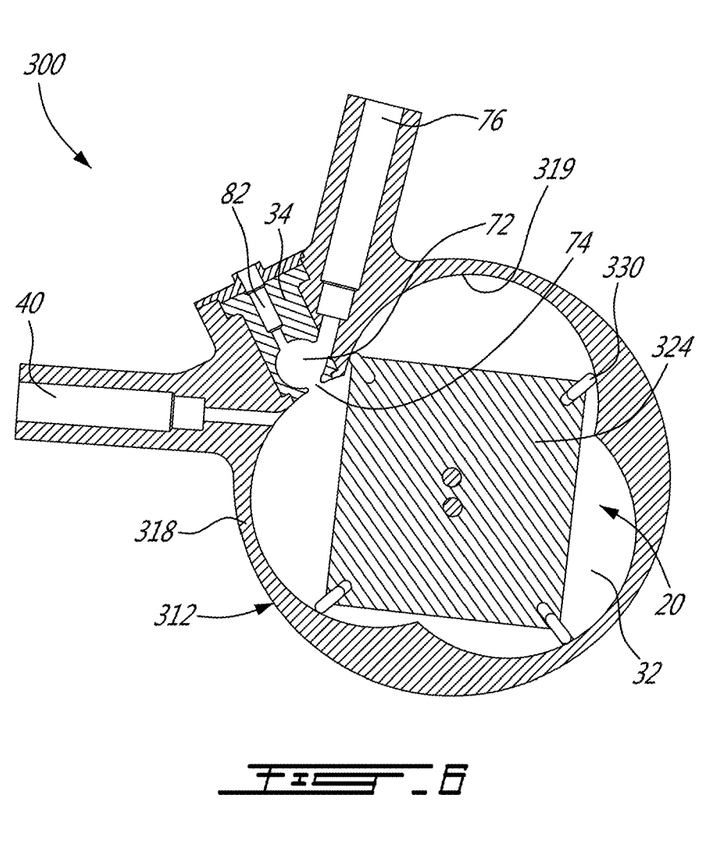

In another particular embodiment, the rotor assembly is configured as a planetary rotating engine having a different geometry than that of the Wankel engine. Referring to FIG. 6, an example of such a rotor assembly is shown. The rotor assembly 300 includes an outer body 312 forming an internal cavity 20 with a peripheral inner surface thereof having an epitrochoid profile defining three lobes. The rotor assembly 300 also includes a rotor 324 with four apex portions 330 in sealing engagement with the peripheral inner surface to form four rotating working chambers 32 of variable volume within the internal cavity 20 around the rotor 324. The rotor 324 is journaled on an eccentric portion of a shaft and performs orbital revolutions within the internal cavity 20.

In the embodiment shown, the pilot subchamber 72 of the rotor assembly 300 is defined in the insert 34 (for example made of a material having a greater heat resistance than that of the peripheral wall 218) received in an insert opening of a peripheral wall 318 of the outer body 312; alternately the pilot subchamber 72 may be defined directly in the outer body 312, for example in the peripheral wall 318, or the pilot injector 72 may be received in any other suitable type of pilot cavity formed in the outer body 312. The peripheral wall 318 also has the main injector elongated hole 40 defined therethrough spaced apart from the insert 34, and the peripheral wall 318 and/or the insert 34 has the pilot injector elongated hole 76 and the ignitor elongated hole 82 defined therethrough.

The above description is meant to be exemplary only, and one skilled in the art will recognize that changes may be made to the embodiments described without departing from the scope of the invention(s) disclosed. For example, the mechanical arrangements of the rotor assemblies described above are merely examples of many possible configurations which are suitable for use with the present invention(s). Any suitable injector configuration and arrangement may be used. Hence, modifications which fall within the scope of the present invention will be apparent to those skilled in the art, in light of a review of this disclosure, and such modifications are intended to fall within the appended claims.

The invention claimed is:

1. A method of operating a rotary engine including a rotor engaged to a shaft and rotationally received in a housing to define a plurality of working chambers of variable volume, the method comprising:
   delivering a pilot quantity of fuel into a pilot cavity in successive communication with the working chambers;
   igniting the pilot quantity of fuel within the pilot cavity; and
   delivering a main quantity of fuel into the working chambers downstream of the successive communication of the pilot cavity with the working chambers;
   wherein at least one of the pilot quantity and the main quantity is varied between successive rotations of the shaft,
   wherein the at least one of the pilot quantity and the main quantity is zero for at least one of the successive rotations of the shaft and greater than zero for at least another one of the successive rotations of the shaft.

2. The method as defined in claim 1, wherein the pilot cavity is a pilot subchamber.

3. The method as defined in claim 1, wherein for each set of first, second and third successive rotations of the shaft, the main quantity is zero and the pilot quantity is greater than zero during the first rotation, the main and pilot quantities are zero during the second rotation, and the main and pilot quantities are greater than zero during the third rotation.

4. The method as defined in claim 1, wherein the pilot quantity is zero for one of x successive rotations of the shaft and greater than zero for the remaining x−1 successive rotations of the shaft, where x is a natural number greater than 1.

5. The method as defined in claim 1, wherein the pilot quantity is greater than zero for one of x successive rotations of the shaft and zero for the remaining x−1 successive rotations of the shaft, where x is a natural number greater than 1.

6. The method as defined in claim 1, wherein the main quantity is zero for one of x successive rotations of the shaft and greater than zero for the remaining x−1 successive rotations of the shaft, where x is a natural number greater than 1.

7. The method as defined in claim 1, wherein the main quantity is greater than zero for one of x successive rotations of the shaft and zero for the remaining x−1 successive rotations of the shaft, where x is a natural number greater than 1.

8. The method as defined in claim 1, wherein the main quantity includes first and second successive injection pulses for each of the working chambers, and wherein one of the first and second injection pulses is omitted for one of x successive rotations of the shaft and performed for the remaining x−1 successive rotations of the shaft, where x is a natural number greater than 1.

9. The method as defined in claim 1, wherein the main quantity includes first and second successive injection pulses for each of the working chambers, and wherein one of the first and second injection pulses is performed for one of x successive rotations of the shaft and omitted for the remaining x−1 successive rotations of the shaft, where x is a natural number greater than 1.

10. The method as defined in claim 1, wherein the rotary engine is a Wankel engine, the rotor having three apex portions separating the working chambers and mounted for eccentric revolutions within an internal cavity of the housing, the internal cavity having an epitrochoid shape with two lobes.

11. A method of operating a rotary engine including first and second rotor assemblies and a shaft, the first and second rotor assemblies including a rotor engaged to the shaft and rotationally received in a housing to define a plurality of working chambers of variable volume, and a pilot cavity in successive communication with the working chambers, the method comprising:
  delivering a pilot quantity of fuel into the pilot cavity;
  igniting the pilot quantity of fuel within the pilot cavity; and
  delivering a main quantity of fuel into the working chambers downstream of the successive communication of the pilot cavity with the working chambers;
  wherein at least one of the pilot quantity and the main quantity of the first rotor assembly is varied between successive rotations of the shaft;
  wherein at least one of the pilot quantity and the main quantity is different between the first and second rotor assemblies during at least one of the successive rotations of the shaft, and wherein the at least one of the pilot quantity and the main quantity of the first rotor assembly is zero for at least one of the successive rotations of the shaft and greater than zero for at least another one of the successive rotations of the shaft.

12. The method as defined in claim 11, wherein the pilot cavity is a pilot subchamber.

13. The method as defined in claim 11, wherein for each set of first, second and third successive rotations of the shaft, the main quantity of the first rotor assembly is zero and the pilot quantity is greater than zero during the first rotation, the main and pilot quantities of the first rotor assembly are zero during the second rotation, and the main and pilot quantities of the first rotor assembly are greater than zero during the third rotation.

14. The method as defined in claim 11, wherein the pilot quantity of the first rotor assembly is zero for one of x successive rotations of the shaft and greater than zero for the remaining x−1 successive rotations of the shaft, where x is a natural number greater than 1.

15. The method as defined in claim 11, wherein the pilot quantity of the first rotor assembly is greater than zero for one of x successive rotations of the shaft and zero for the remaining x−1 successive rotations of the shaft, where x is a natural number greater than 1.

16. The method as defined in claim 11, wherein the main quantity of the first rotor assembly is zero for one of x successive rotations of the shaft and greater than zero for the remaining x−1 successive rotations of the shaft, where x is a natural number greater than 1.

17. The method as defined in claim 11, wherein the main quantity of the first rotor assembly is greater than zero for one of x successive rotations of the shaft and zero for the remaining x−1 successive rotations of the shaft, where x is a natural number greater than 1.

18. The method as defined in claim 11, wherein the main quantity of the first rotor assembly includes first and second successive injection pulses for each of the working chambers, and wherein one of the first and second injection pulses is omitted for one of x successive rotations of the shaft and performed for the remaining x−1 successive rotations of the shaft, where x is a natural number greater than 1.

19. The method as defined in claim 11, wherein the main quantity of the first rotor assembly includes first and second successive injection pulses for each of the working chambers, and wherein one of the first and second injection pulses is performed for one of x successive rotations of the shaft and omitted for the remaining x−1 successive rotations of the shaft, where x is a natural number greater than 1.

20. The method as defined in claim 11, wherein the first and second rotor assemblies are Wankel engines, the rotor having three apex portions separating the working chambers and mounted for eccentric revolutions within an internal cavity of the housing, the internal cavity having an epitrochoid shape with two lobes.

21. The method as defined in claim 11, further comprising a third rotor assembly engaged to the shaft, wherein the at least one of the pilot quantity and the main quantity is different between the first, second and third rotor assemblies during the at least one of the successive rotations of the shaft.

* * * * *